United States Patent
Green et al.

(10) Patent No.: US 7,114,028 B1
(45) Date of Patent: Sep. 26, 2006

(54) METHOD OF AUTOMATICALLY FORMATTING AND PSEUDO-MOUNTING A REMOVABLE MEDIA

(75) Inventors: Mark A. Green, Berthoud, CO (US); Dennis M. Summers, Port Orchard, WA (US); Gregory P. Fry, Portland, OR (US); David A. Coleman, Silverdale, WA (US); Carl Fry, Portland, OR (US)

(73) Assignee: Sonic Solutions, Novato, CA (US)

( * ) Notice: Subject to any disclaimer, the term of this patent is extended or adjusted under 35 U.S.C. 154(b) by 360 days.

(21) Appl. No.: 10/340,175

(22) Filed: Jan. 9, 2003

Related U.S. Application Data

(63) Continuation-in-part of application No. 10/210,824, filed on Jul. 31, 2002.

(60) Provisional application No. 60/382,495, filed on May 21, 2002.

(51) Int. Cl.
  *G06F 12/00* (2006.01)
  *G11B 27/36* (2006.01)

(52) U.S. Cl. .................. 711/111; 711/154; 369/59.25

(58) Field of Classification Search .............. 715/769; 711/111, 112, 170, 154; 707/200, 205; 369/59.25
See application file for complete search history.

(56) References Cited

U.S. PATENT DOCUMENTS

| | | | |
|---|---|---|---|
| 6,026,402 A * | 2/2000 | Vossen et al. ................. 707/9 |
| 6,633,515 B1 * | 10/2003 | Van Nieuwenhoven et al. . 369/30.04 |
| 6,795,803 B1 * | 9/2004 | Tanaka et al. ................. 703/24 |
| 6,882,795 B1 * | 4/2005 | McMurdie et al. ......... 386/125 |
| 2003/0136846 A1 * | 7/2003 | Higgings et al. ........... 235/487 |
| 2003/0169283 A1 * | 9/2003 | Rosenberg ................. 345/704 |

\* cited by examiner

*Primary Examiner*—Matthew Kim
*Assistant Examiner*—Shane M. Thomas
(74) *Attorney, Agent, or Firm*—Martine Penilla & Gencarella, LLP

(57) ABSTRACT

An invention is disclosed for automatically formatting removable media. A default media image is generated in computer memory in response to detecting unformatted media in a computer drive. The media image includes default file system structures for the media. In response to receiving a request to read the media, data is returned based on the default file system structures. However, the removable media is automatically prepared for content in response to receiving a request to write information to the media, wherein the default media image in memory is committed to the media.

21 Claims, 10 Drawing Sheets

METHOD OF AUTOMATICALLY FORMATTING AND PSEUDO-MOUNTING A REMOVABLE MEDIA

CROSS REFERENCE TO RELATED APPLICATIONS

This application claims the benefit of U.S. Provisional Patent Application No. 60/382,495, filed on May 21, 2002, entitled "Automatic Format of Removable Media," which is incorporated herein by reference. This application is a continuation-in-part of U.S. patent application Ser. No. 10/210,824, filed on Jul. 31, 2002, and entitled "Automatic Format of Removable Media," which is incorporated herein by reference. This application is related to 1) U.S. patent application Ser. No. 10/143,285, filed on May 9, 2002, now U.S. Pat. No. 6,983,292, entitled "Method and Apparatus for Formatting and Initialization of Rewritable Optical Media," and 2) U.S. patent application Ser. No. 10/193,422, filed Jul. 10, 2002, entitled "Method and Apparatus for Formatting and Initialization of Re-Writable Optical Media Using Multiple Tracks," both of which are hereby incorporated by reference.

BACKGROUND OF THE INVENTION

1. Field of the Invention

This invention relates generally to computer readable removable media management, and more particularly to automatic preparation of computer readable removable media for content.

2. Description of the Related Art

Currently, computer readable removable media, such as floppy disks, CDs, and DVDs, requires preparation before being capable of storing data. This preparation generally takes the form of formatting the removable media. Broadly speaking, formatting organizes and divides the media into pieces that can be controlled for convenient storage and access. For example, a disk may be formatted into sectors, tracks, and clusters, which can be accessed via the operating system.

Although floppy disks generally are available preformatted, most other computer readable removable media, such as optical media, still require the user to perform a manual format. For example, FIG. 1 is a flowchart showing a method 100 conventionally used to prepare removable media for accepting data. In an initial operation 102, pre-process operations are performed. Preprocess operations can include, for example, selecting an appropriate storage media, preparing data to write to the storage media, and other preprocess operations that will be apparent to those skilled in the art.

In operation 104, the user inserts the unformatted media into the appropriate drive. For example, when writing a large amount of data, a user can select a blank, unformatted CD and insert the unformatted CD into the CD drive. Upon closing the drive, and with appropriate CD management software installed, the computer system generally will recognize the CD is unformatted and prompt the user to format the CD.

In operation 106, the user selects a format type and manually formats the removable media. For example, FIG. 2 illustrates an exemplary conventional CD format utility 200. The conventional CD format utility 200 includes an information window 202, a CD status window 204, a plurality of function buttons 206–212, a format button 214, and an eject button 216. In operation, the status of the CD is shown in the status window 204. For example, the status window 204 can show the type of CD inserted into the CD drive, and the amount of free space left on the CD. The user can utilize the option button 208 to select an appropriate format type for the CD. Once the type of format is selected, or default set, the format button 214 can be used to format the CD.

In another example, a user can select a format button on the main screen and be presented with a dialog box containing various formatting choices. The user then selects a format type, clicks the Start Format button, and formatting commences. After a period of time the CD formatting operation will be complete and the user will be informed of the format status in the information window 202.

Referring back to FIG. 1, once the user has formatted the media, the user can write data to the media, in operation 108. Generally, a user will write to the media using a drag and drop method, or cut and paste method. When using a drag and drop method, the user selects a file using the mouse cursor and the left or right mouse button. While keeping the mouse button depressed, the user drags the icon for the file to the drive icon for the media or an open window for the drive. When the user releases the mouse button the file is written to the formatted media in the drive.

Optionally, the operating system may allow the user to select how the data is written to the media. For example, the user may be able to select whether the data should be moved to the removable media (and erased from its current location) or only copied to the removable media. Post process operations are performed in operation 110. Post process operations can include updating directory viewing applications to show the newly copied data on the media, and other post process operations that will be apparent to those skilled in the art.

Unfortunately, many new computer users are unfamiliar with formatting requirements. As such, users may have difficulty in selecting an appropriate type of format for a particular removable media, or may not format the media before attempting to write to the unformatted media. As a result, many users experience errors, data loss, and frustration when using unformatted computer readable removable media.

In view of the foregoing, there is a need for systems and methods for allowing a user to utilize blank unformatted removable media without manually formatting the media. The methods should allow users to access and use removable media, such as CDs and DVDs, in a manner similar to using pre-formatted removable media, such as pre-formatted floppy disks.

SUMMARY OF THE INVENTION

Broadly speaking, embodiments of the present invention address these needs by providing a driver level automatic formatting technique for automatically preparing removable media for content. Embodiments of the present invention allow users to access and use unformatted removable media in a manner similar to that used when accessing and using pre-formatted removable media. In one embodiment a method is disclosed for automatically formatting removable media. A default media image is generated in computer memory in response to detecting unformatted media in a computer drive. The media image includes default file system structures for the media. In response to receiving a request to read the media, data is returned based on the default file system structures. However, the removable media is automatically prepared for content in response to receiving a request to write information to the media, wherein the default media image in memory is committed to the media. The information can be written to the media either after the default media image is committed to the media, or the default media image can be modified to include the information prior to being committed to the media. As will be seen subsequently, the media can be any form of removable media, such as a compact disc, a digital video disc, or a floppy disk.

A file system driver for use in conjunction with an operating system is disclosed in an additional embodiment. The file system driver includes a code segment that generates a default media image in computer memory in response to detecting unformatted media in a computer drive. As above, the media image includes default file system structures for the media. In addition, a code segment is included that returns data based on the default file system structures in response to receiving a request to read the media. The file system driver further includes a code segment that automatically prepares the removable media for content in response to receiving a request to write information to the media, wherein the default media image in memory is committed to the media. As discussed previously, the information can be written to the media either after the default media image is committed to the media, or the default media image can be modified to include the information prior to being committed to the media.

An additional file system driver for automatically formatting removable media is disclosed in a further embodiment of the present invention. The file system driver includes a code segment that analyzes media to detect a file system present on the media in response to detecting media in a computer drive. Further, a code segment is included that mounts the media when a predefined file system is detected on the media. As above, the file system driver further includes a code segment that generates a default media image, which includes default file system structures for the media, in computer memory when the media is unformatted. To handle the unformatted media, the file system driver includes a code segment that returns data based on the default file system structures in response to receiving a request to read the unformatted media. Also, a code segment is included that automatically prepares the removable media for content in response to receiving a request to write information to the unformatted media, wherein the default media image in memory is committed to the media.

Advantageously, embodiments of the present invention allow new unformatted media to be utilized in a manner similar to using preformatted media. That is, formatting is performed automatically, without user intervention, and generally without any indication to the user that the media is being formatted. Further, the embodiments of the present invention advantageously work regardless of the target file system for the media. For example embodiments of the present invention can be utilized when the target file system can be a universal disk format (UDF), an NT file system (NTFS), a file allocation table (FAT) based file system, or any other type of file system. In addition, the embodiments of the present invention can further be used with other background formatting methods, such as Mt. Rainier, DVD+RW, RWNow!, HP Fast Format, and other background formatting methods. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a driver level automatic formatting system for automatically preparing removable media for content. Embodiments of the present invention allow users to access and use unformatted removable media in a manner similar to that used when accessing and using pre-formatted removable media. Broadly speaking embodiments of the present invention create an image of a mounted media in memory. Information from this image is presented to the operating system. When a request to modify the media is received, the media is automatically formatted transparently, without user intervention, thus hiding the format operation from the user.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The majority of users of removable media generally do not have a preference as to the type of formatting performed on removable media they are using. For example, a typical user of a CD-R generally is not concerned with how the CD-R is formatted. This user typically wishes to write and read files to and from the CD-R, regardless of the manner in which the CD-R is prepared. Hence, embodiments of the present invention automatically prepare removable media for content. For example, using the embodiments of the present invention, a user can write to an unformatted CD-R without manually formatting the CD-R prior to writing to the disc. That is, the embodiments of the present invention automatically prepare the disc for content. In particular, embodiments of the present invention intelligently select an appropriate format type for removable media in a drive, and as the user attempts to save files to the media, embodiments of the preset invention automatically format the media prior to writing the data to the media.

Figure 1:
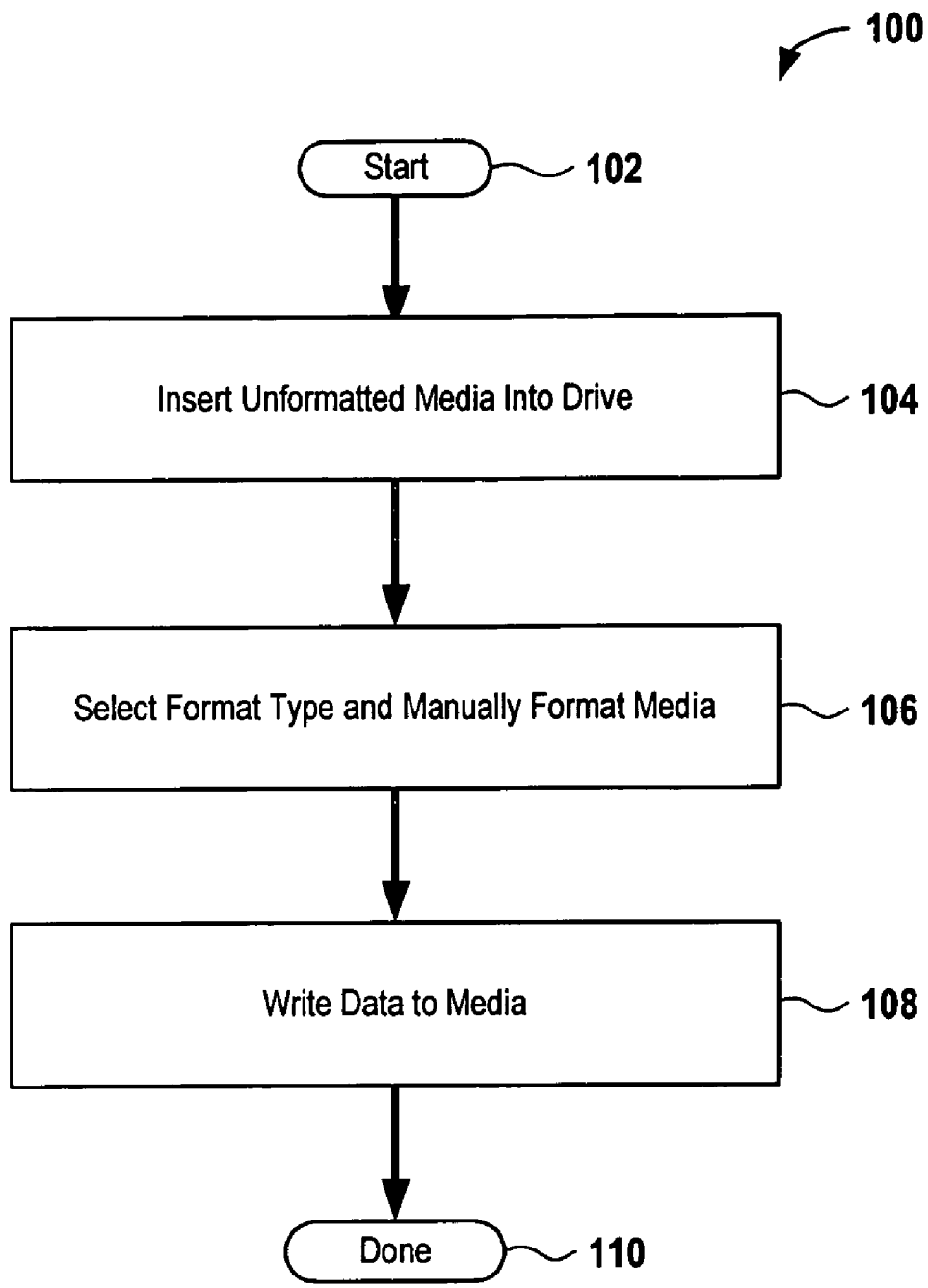
FIG. 1 is a flowchart showing a method conventionally used to prepare removable media for accepting data.
Figure 2:
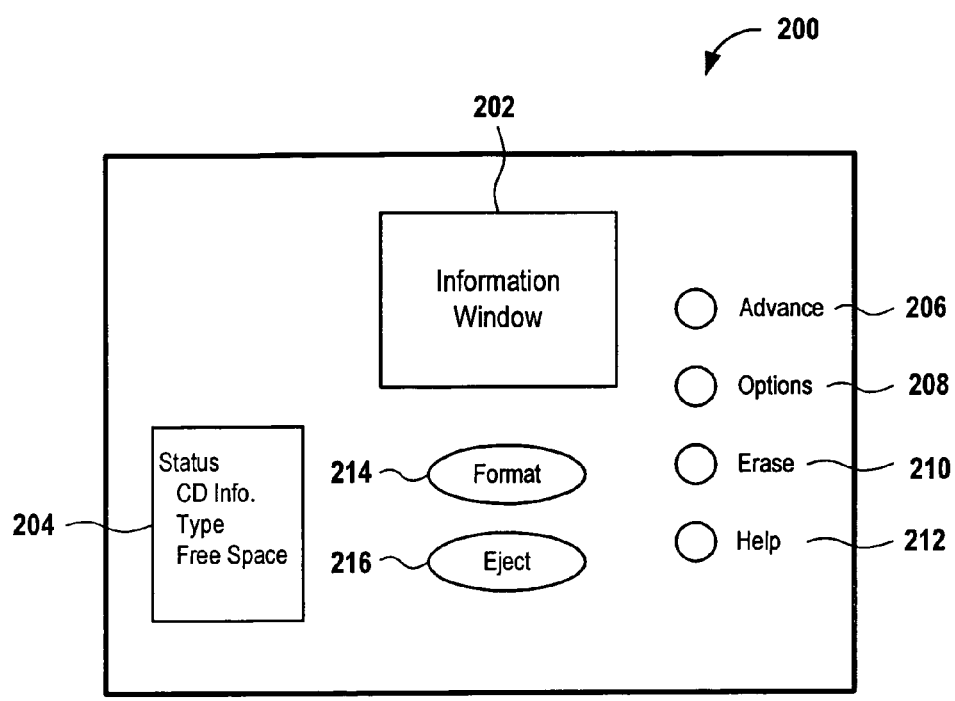
FIG. 2 illustrates an exemplary conventional CD format utility.
Figure 3:
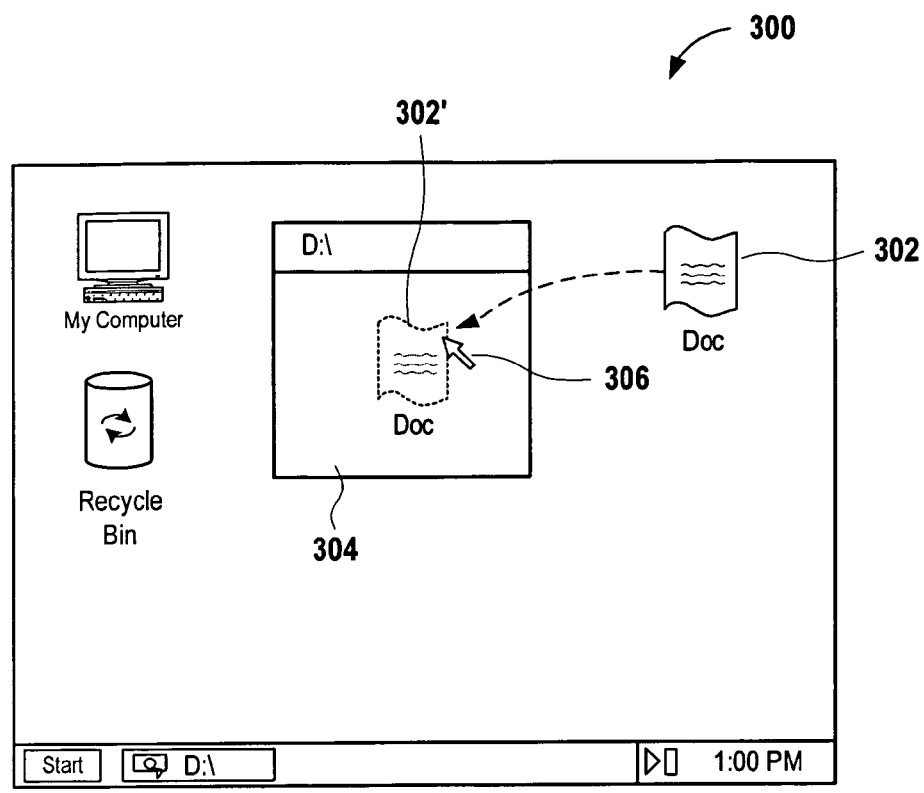
FIG. 3 illustrates an exemplary computer screen view showing a user initiated save to an unformatted removable media, in accordance with an embodiment of the present invention.

FIG. 3 illustrates an exemplary computer screen view 300 showing a user initiated save to an unformatted removable media, in accordance with an embodiment of the present invention. FIG. 3 illustrates the ease with which a user can utilize unformatted removable media via the embodiments of the present invention. Hence, a user can open a window 304 to a drive having unformatted removable media. For example, in FIG. 3, the user can open a window to a CD-R/RW drive containing an unformatted CD-R. In addition, the user can select a file 302 to save to the media using the mouse cursor 306. Generally, to save the file to the media, the user drags the icon representing the file 302 to the window 304 and releases the mouse button.

At this point, embodiments of the present invention recognize the user is attempting to write to unformatted media, such as the unformatted CD-R. In response, the CD-R is formatted prior to performing the write operation. Advantageously, this format is performed automatically, without user intervention, and generally without any indication to the user that the CD is being formatted. Once the CD is formatted, the write operation is allowed to continue, and file 302' is written to the CD.

It should be noted that the user can write content to media in several different manners. For example, in FIG. 3, the user can select the icon representing the file 302 and press the right mouse button. In this case, a menu generally will appear that allows the user to select from several different operations related to the selected file 302. One of these operations can be a "send to" operation, which allows a user to select a particular drive on which to write the selected file 302. Other exemplary file writing techniques include using a "Windows™ explorer" program to transfer the file to the unformatted media, and "dragging" the file to a drive icon.

When using a "Windows™ explorer" program, for example, the user generally selects a folder having the file 302 from a list of folders displayed in a left frame of the Windows™ explorer user interface. The contents of the selected folder are then displayed in a right frame of the windows Windows™ explorer user interface. The user can "drag" the icon representing the file 302 from the right frame to the desired media drive icon in the left frame to save the file 302.

When "dragging" the file to a drive icon, the user selects a file 302 to save to the media using the mouse cursor 306. Then, to save the file to the media, the user drags the icon representing the file 302 to the drive icon and releases the mouse button. Other techniques for writing a file to removable media exist and are dependent on the operating system environment utilized by the computer system. As such, it should be appreciated that the embodiments of the present can be utilized in conjunction with any technique utilized to interact with removable media.

As mentioned above, several different types of formatting may be possible with any particular removable media. For example, a CD-RW can be, for example, formatted using a quick format, a full format, or one of several other format types. To determine the type of format to utilize when automatically formatting the removable media, embodiments of the present invention examine the media type and state, and the corresponding drive.

Figure 4:
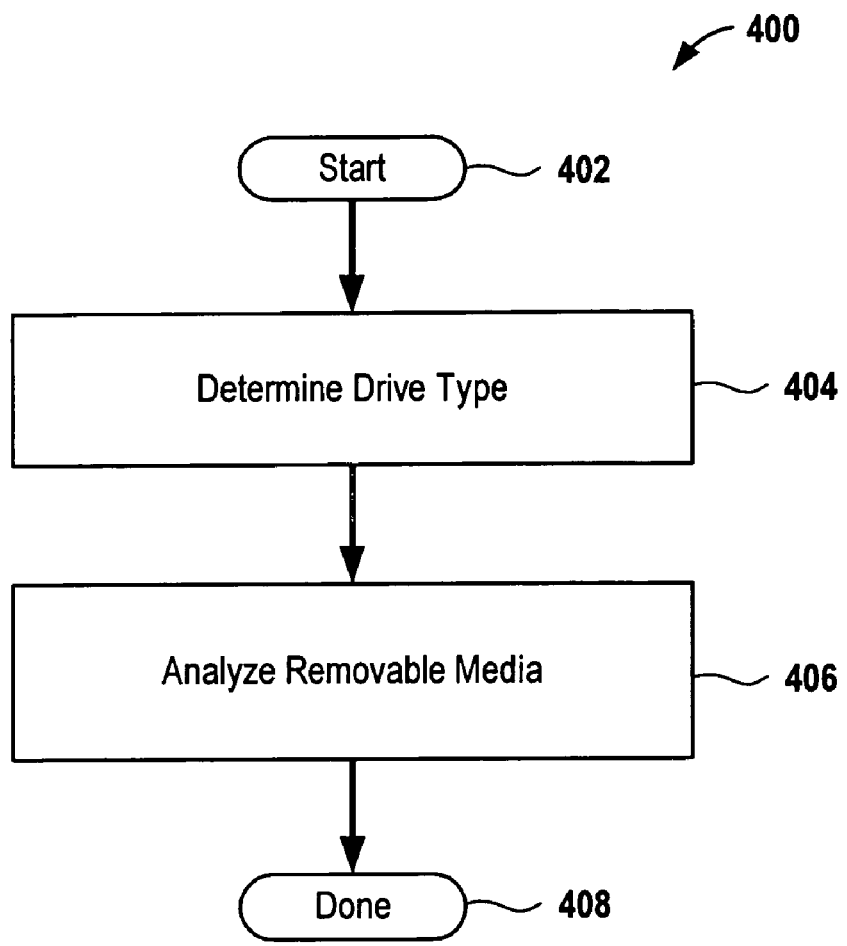
FIG. 4 is a flowchart showing a method for automatically determining an appropriate format type for a removable media, in accordance with an embodiment of the present invention.

FIG. 4 is a flowchart showing a method 400 for automatically determining an appropriate format type for a removable media, in accordance with an embodiment of the present invention. In operation 402, preprocess operations are performed. Preprocess operations can include, for example, determining the number and location of removable media drives in the system, sensing when new media is inserted in a drive, and other preprocess operations that will be apparent to those skilled in the art after a careful reading of the present disclosure.

Figure 5:
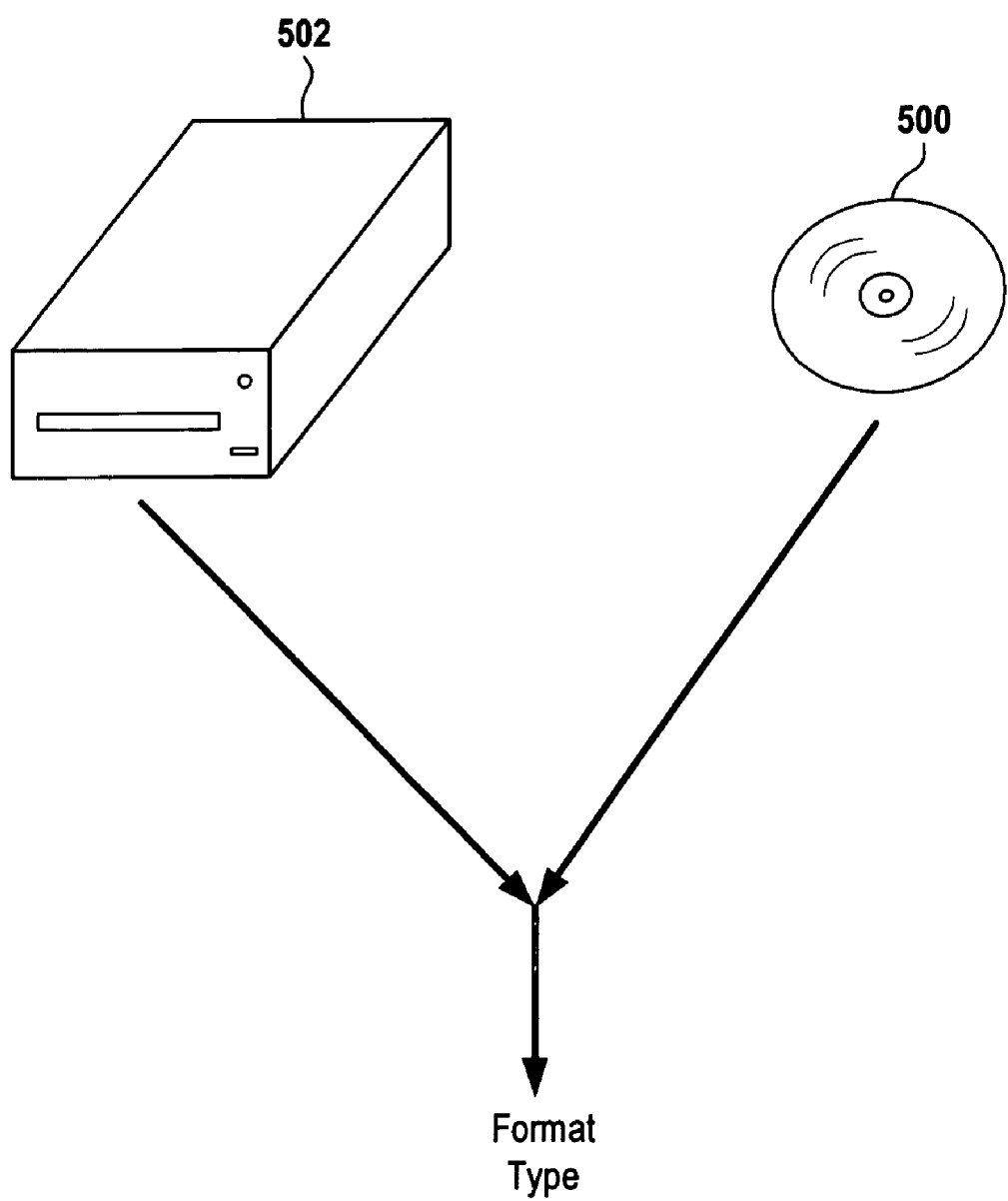
FIG. 5 is a diagram illustrating the sources utilized by the embodiments of the present invention to determine format type, in accordance with an embodiment of the present invention.

In operation 404, the drive containing the removable media is analyzed to determine the drive type. FIG. 5 is a diagram illustrating the sources utilized by the embodiments of the present invention to determine format type, in accordance with an embodiment of the present invention. As shown in FIG. 5, embodiments of the present invention examine the media 500 and the drive 502 containing the media 500 to determine format type. When examining the drive 502, embodiments of the present invention analyze the properties of the drive 502, such as the manufacturer and model number, to determine the capabilities of the drive 502.

Different drive types can have different capabilities, and thus, may support varying format types. For example, specific drives manufactured by Hewlett-Packard allow a format type called "fastformat," which provides fast formatting. Similarly, a Mount Rainier Drive, for example, allows Mount Rainier formatting, which performs an initial format then allows the user to interact with the drive while the remainder of the formatting continues. Other drive manufactures can support still further formatting types. Hence, the embodiments of the present invention examine the drive type to determine the format types supported by the drive.

Referring back to FIG. 4, the removable media present in the drive is analyzed, in operation 406. As shown in FIG. 5, and mentioned above, embodiments of the present invention examine the media 500 and the drive 502 containing the media 500 to determine format type. When examining the media 500, embodiments of the present invention determine the type of media and the state of the media. The type of media determines the format types that can be utilized to format the media. For example, a floppy disk can be formatted using different format types than are available when formatting a CD-R. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform. Once the format type is selected, the removable media can be formatted when the user attempts to interact with the media.

Turning back to FIG. 4, post process operations are performed in operation 408. Post process operations can include detecting when new media is inserted in the drive, allowing a user to manually format the media, formatting the media in response to receiving a user request to write to the media, and other post process operations that will be apparent to those skilled in the art after a careful reading of the present disclosure. Hence, by analyzing the drive and media, embodiments of the present invention can automatically format unformatted media without requiring user intervention, as described below with reference to FIG. 6.

Figure 6:
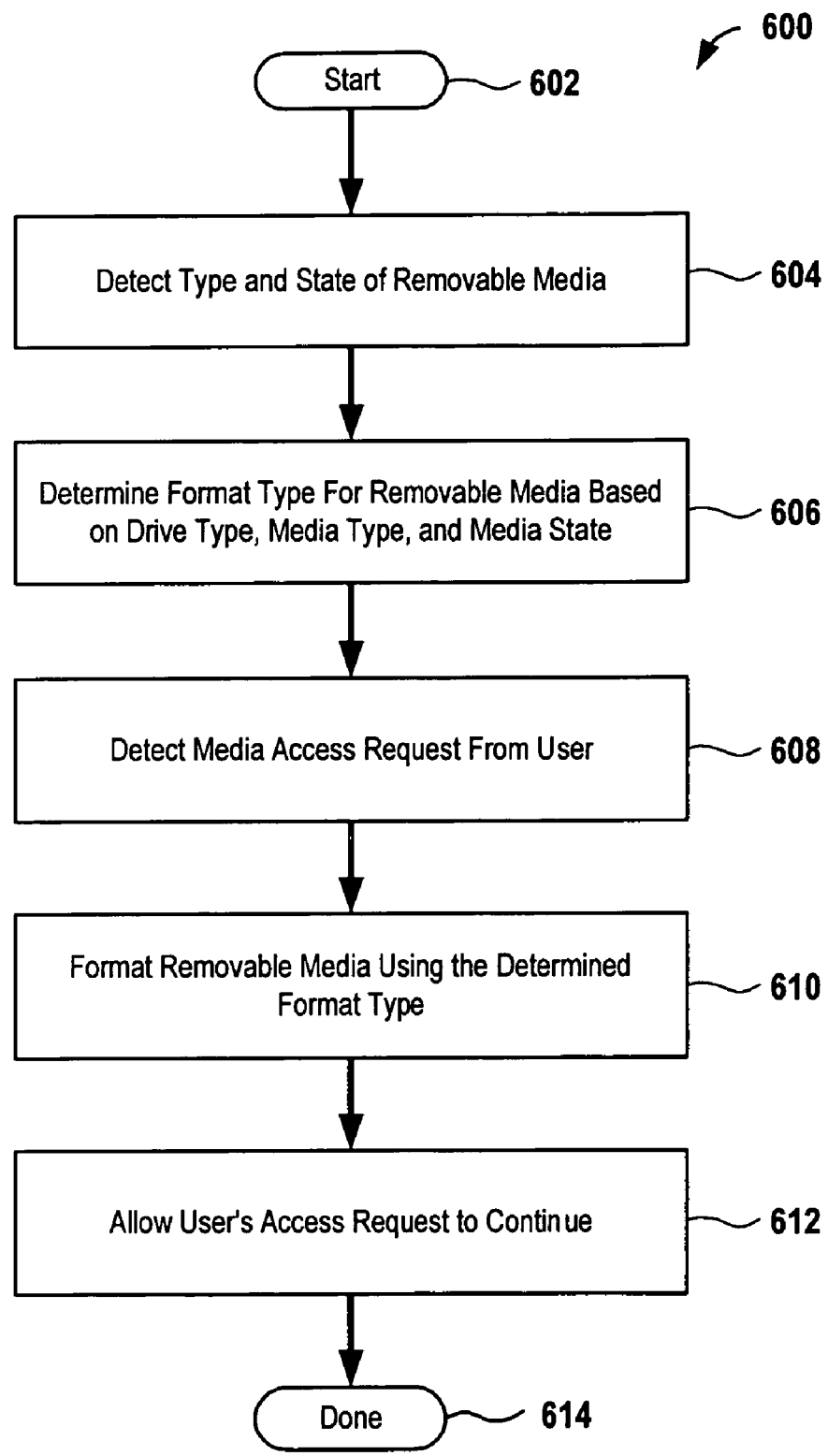
FIG. 6 is a flowchart showing a method for automatically preparing removable media for content, in accordance with an embodiment of the present invention.

FIG. 6 is a flowchart showing a method 600 for automatically preparing removable media for content, in accordance with an embodiment of the present invention. In an initial operation 602, preprocess operations are performed. Preprocess operations can include, for example, determining the drive type of the drive containing the removable media, detecting the presence of new removable media in the drive, and other preprocess operations that will be apparent to those skilled in the art after a careful reading of the present disclosure.

In operation 604, the type and state of the removable media is detected. As mentioned above, embodiments of the present invention examine the media and the drive containing the media to determine format type. When examining the media, embodiments of the present invention determine the type of media and the state of the media. As mentioned previously, the type of media determines the format types that can be utilized to format the media. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform.

Based on the drive type, media type, and media state, a format type is determined for the removable media, in operation 606. As will be described subsequently, embodiments of the present invention can prepare media for receiving content in response to a user's attempt to write to such media. To reduce the amount of processing required at the time of formatting, embodiments of the present invention can determine the type of format that will be used for a particular unformatted media in a particular drive prior to receiving a request to access the media. In this manner, the format type will be previously determined when the actual format is performed, thus saving time during the format operation. However, it should be noted that embodiments of the present invention are not limited to determining the format type prior to receiving a user request to access the media, and can thus determine the format type at any time prior to actually formatting the media.

For example, tables 1–3 below show exemplary format type selections based on the type of media and the type of drive. In particular, table 1 illustrates exemplary format type selections for unformatted media when used with a standard drive, and a Mount Rainier Drive.

TABLE 1

| Media | Standard Drive | Description | Mount Rainier Drive |
|---|---|---|---|
| CD-R | Quick Format | File system written to disc | N/A |
| CD-RW | Quick Format as CD-R | File system written to disc | Mount Rainier Format |
| DVD-RAM | Quick Format | Block structure already on disc; file system written | N/A |
| DVD-R | Quick Format | Like CD-R; file system written to disc | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format |
| DVD+R | Like CD-R/DVD-R | | N/A |

Table 2 illustrates exemplary format type selections for previously written media when the media is mounted using software known by the developer, and when used with a standard drive, and a Mount Rainier Drive, in accordance with an embodiment of the present invention.

TABLE 2

| Media | Standard Drive | Description | Mount Rainier Drive |
|---|---|---|---|
| CD-R | N/A | Can not re-format CD-R | N/A |
| CD-RW | Quick format | Do a quick format on previously written CD-RW. | Mount Rainier Format: if MR disc, do a quick MR format. If a mounted non-MR format, do a quick format. |
| DVD-RAM | Quick Format. Ready for reading and writing | | N/A |
| DVD-R | N/A | Can't re-format DVD-R | N/A |
| DVD-RW | Quick format | Drives contain the ability to simulate a built in background formatting, file system written to disc. | N/A |
| DVD+RW | Quick Format | Drives contain built-in background formatting; file system written to disc | Mount Rainier format if a MR disc, otherwise, full format. |
| DVD+R | N/A | Can't re-format DVD+R | N/A |

Table 3, below, illustrates exemplary format type selections for previously written media when the media is mounted using software unknown by the developer, and when used with a standard drive, and a Mount Rainier Drive, in accordance with an embodiment of the present invention.

TABLE 3

| Media | Standard Drive | Description | Mount Rainier Drive |
|---|---|---|---|
| CD-R | N/A | Can't re-format CD-R | N/A |
| CD-RW | Full Format | Minimally blank the disc, do a full format. | Mount Rainier Format: if MR disc, do a quick MR format. If a mounted non-MR format, do a quick format. |
| DVD-RAM | Quick Format | Rewrites file system | N/A |
| DVD-R | N/A | Can't re-format DVD-R | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format if a MR disc, otherwise, full format. |
| DVD+R | N/A | Can't re-format DVD+R | N/A |

In operation 608, a media access request from the user is detected. As mentioned previously, a user can request access to media using a plurality of different techniques. For example, the user can select a file to save to the media using the mouse cursor. Then, drag the icon representing the file to the window for the drive while keeping the mouse button depressed. Finally, the user releases the mouse button to save the file to the media. In addition, the user can select the icon representing the file and press the right mouse button. In this case, a menu will generally appear that allows the user to select from several different operations related to the selected file. One of these operations can be a "send to" operation, which allows a user to select a particular drive one which to write the selected file.

Other exemplary file writing techniques include using a "Windows™ explorer" program to transfer the file to the unformatted media, and "dragging" the file to a drive icon. As discussed previously, when using a "Windows™ explorer" program, for example, the user generally selects a folder having the file from a list of folders displayed in a left frame of the Windows™ explorer user interface. The contents of the selected folder are then displayed in a right frame of the Windows™ explorer user interface. The user can "drag" the icon representing the file from the right frame to the desired media drive icon in the left frame to save the file.

When "dragging" the file to a drive icon, the user selects a file to save to the media using the mouse cursor, and drags the icon representing the file to the drive icon. The user then releases the mouse button to save the file to the media. Other techniques for writing a file to removable media exist and are dependent on the operating system environment utilized by the computer system. As such, it should be appreciated that the embodiments of the present can be utilized in conjunction with any technique utilized to interact with removable media.

Regardless of the technique the user utilizes to request access to the media, embodiments of the present invention can detect this request. For example, embodiments of the present invention can "listen" for an interrupt that indicates a user is trying to access the media. In a further embodiment, drive access requests can be intercepted. Regardless of the manner in which the access request is detected, embodiments of the present invention format the removable media in response to detecting the media access request, as described in operation 610.

In operation 610, the removable media is formatted using the format type determined in operation 606. As mentioned above, embodiments of the present invention can utilize several formatting types to format a particular removable media as described above, with reference to Tables 1–3. For example, to reduce the amount of time required to format CD-RWs, embodiments can format CD-RWs using several techniques that reduce the formatting time. In one embodiment, for example, a CD-RW can be formatted as a CD-R, by performing a sequential format. In this case, the formatting time for the CD-RW is about that of a CD-R. Although, the versatility of the CD-RW can be reduced when formatted in this manner, the timesavings can compensate the lost versatility for some users.

In operation 612, the user's request to access the media is allowed to continue. Once the media has been formatted, in operation 610, the media can accept content. Thus, the user's request to access the media is allowed to continue as originally requested. For example, when a user drags a file to an unformatted CD-RW, embodiments of the present invention first automatically format the CD-RW, then allow the file to be written to the newly formatted disc. In this manner, the user can utilize unformatted removable media in a manner similar to using previously prepared and formatted removable media.

Post process operations are performed in operation 614. Post process operations can include, for example, detecting new media in the drive, selecting a new format type, and other post process operations that will be apparent to those skilled in the art after a careful reading of the present disclosure. In addition to preparing media for content based on the drive type, media type, and media state, embodiments of the present invention can also base the format type on the type of content being written to the media.

Embodiments of the present invention utilize a file system driver to claim all blank media, or other compatible media, and treat the media as though it were already mounted. Upon receiving a request that will modify the media, such as a drag and drop, a volume label change, or creating a file, the file system driver will format the media automatically. Advantageously, the embodiments of the present invention work regardless of the target file system for the media, for example the target file system can be a universal disk format (UDF), an NT file system (NTFS), a file allocation table (FAT) based file system, or any other type of file system. In addition, the embodiments of the present invention can further be used with other background formatting methods, such as Mt. Rainier, DVD+RW, RWNow!, HP Fast Format, and other background formatting methods.

Figure 7:
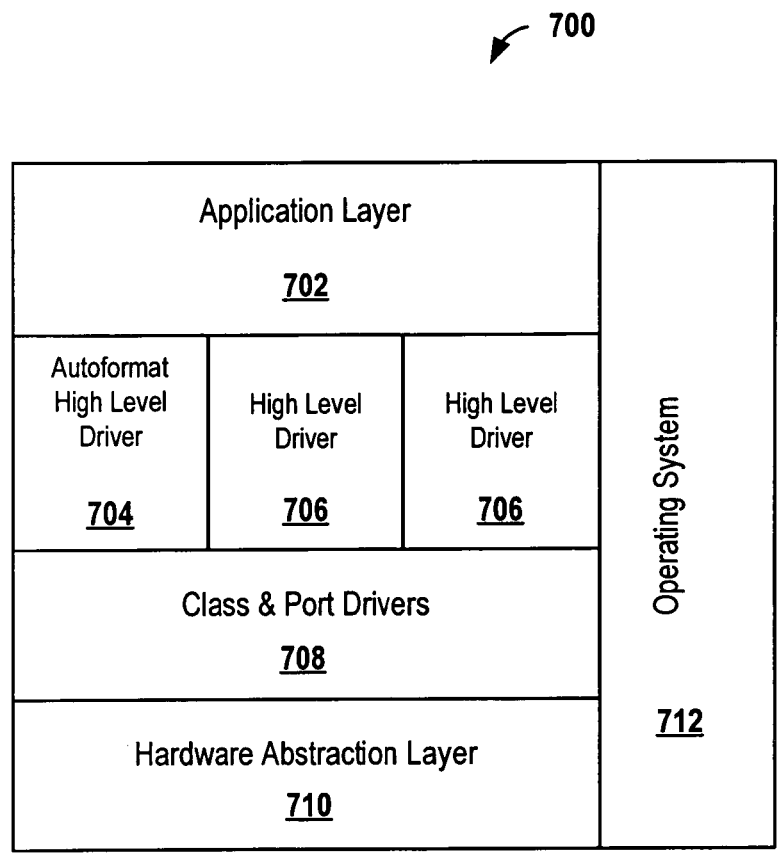
FIG. 7 is a software layer diagram for automatic formatting of removable media in a computer system, in accordance with an embodiment of the present invention.

FIG. 7 is a software layer diagram 700 for automatic formatting of removable media in a computer system, in accordance with an embodiment of the present invention. An application layer 702 resides at the top of the software layer diagram 700 and is in communication with the operating system 712. As illustrated in FIG. 7, the operating system 712 generally is in communication with all the software layers of the computer system. Below the application layer 702 reside high level file system drivers 706 for the system. In addition, an autoformat high level file system driver 704 is included, which allows automatic formatting of removable media, as described in greater detail subsequently. Below the high level file system drivers 704 and 706 are class and port drivers 708, which provide an interface to the hardware abstraction layer 710.

When removable media, such as an optical disc, is inserted into a removable media drive, the operating system 712 is notified. In response, the operating system 712 typically notifies applications residing in the application layer 702 that there is new removable media in a drive. Applications interested in such an event, for example a Windows™ shell application, query the operating system 712 for the details of the new media.

In response, the operating system 712 queries the file system drivers 704 and 706 for information on the new media. In particular, the operating system 712 generally queries the autoformat file system driver 704 first. The autoformat file system 704 will examine the new media's contents to see if it can mount the new media and return the requested information to the operating system 712. If the autoformat file system driver 704 does not provide the needed information, the operating system 712 continues by querying the remaining file system drivers 706. This process continues until a file system driver provides information on the new media, or the last file system driver 706 has been queried and cannot recognize the media. At this point, the operating system returns an error or other indication that the new media cannot be read. However, when a file system driver recognizes the new media as a file system that it can handle, the file system driver mounts the new media and provides information on the new media to the operating system.

Generally, when a prior art high level file system driver encounters unformatted media, the driver will not detect a recognizable file system on the media and thus will inform the operating system that the driver cannot mount the media. However, when the autoformat file system driver 704 of the embodiments of the present invention encounters unformatted media, the driver 704 operates as though it has mounted the new media. That is, when embodiments of the present invention encounter unformatted media, the autoformat file system driver 704 generates a media image in memory and provides data to the operating system using the media image, as shown in FIG. 8.

Figure 8:
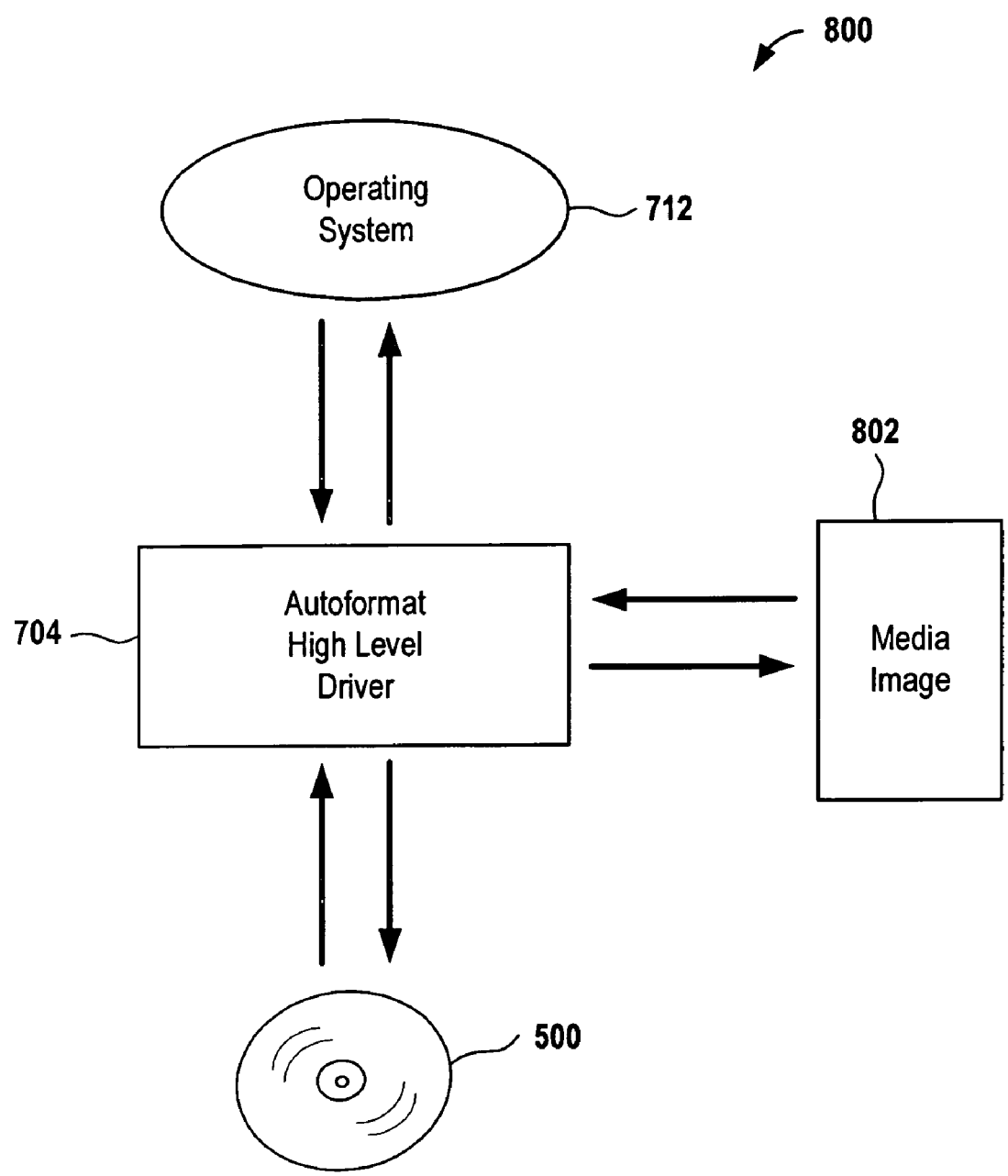
FIG. 8 is an illustration showing an autoformat file system driver data flow, in accordance with an embodiment of the present invention.

FIG. 8 is an illustration showing an autoformat file system driver data flow 800, in accordance with an embodiment of the present invention. As mentioned above, when removable media 500 is inserted into a drive, the operating system 712 is notified and, in turn, notifies any executing applications. Upon being notified of the new media, applications can query the operating system 712 regarding the details of the new media. In response, the operating system 712 queries the autoformat file system driver 704 for information on the new media.

The autoformat file system driver 704 examines the new media 500 in response to receiving the query from the operating system 712. As mentioned above, removable media 500 can be either formatted or unformatted. When the media 500 is formatted, the autoformat file system driver 704 analyses the media 500 to determine what file system is present on the media 500. As will be explained in greater detail subsequently, embodiments of the present invention examine potential anchor points at several different locations on the media to determine what, if any, file system is present on the media 500. Once the file system is determined, the autoformat file system driver 704 decides whether or not the file system present on the media is a file system that the autoformat file system driver 704 supports. If not, the autoformat file system driver 704 informs the operating system that the next file system driver should be examined to obtain information on the media 500. However, if the autoformat file system driver 704 supports the file system present on the media 500, the autoformat file system driver 704 mounts the media 500.

When the autoformat file system driver 704 of the embodiments of the present invention encounters unformatted media 500, the autoformat file system driver 704 behaves in a manner similar to mounting formatted media. In particular, when the autoformat file system driver 704 examines unformatted media 500, the autoformat file system driver 704 generates a media image 802 in memory.

As described in greater detail subsequently, embodiments of the present invention create a media image 802 in memory that includes default file system structures for the media. For example, when creating a UDF file system, the file system structures include volume descriptor sequences, volume integrity sequences, spare tables, spare locations, a space bitmap, a file set descriptor, and an entry for a root directory. At this point, none of the information is committed to the media 500, that is, the media image 802 is retained in memory.

As the operating system requests information regarding the new unformatted media 500, the autoformat file system driver 704 provides the requested data from the media image 802 to the operating system 712. In this manner, the operating system, and by extension application programs, can interact with the unformatted media in a manner similar to formatted media using the autoformat file system driver 704.

However, when the operating system attempts to modify the unformatted media 500, the autoformat file system driver 704 formats the media and commits the media image 802 to the media 500. Once formatted, the autoformat file system driver 704 can modify the media 500 as the operating system 712 requested.

Figure 9:
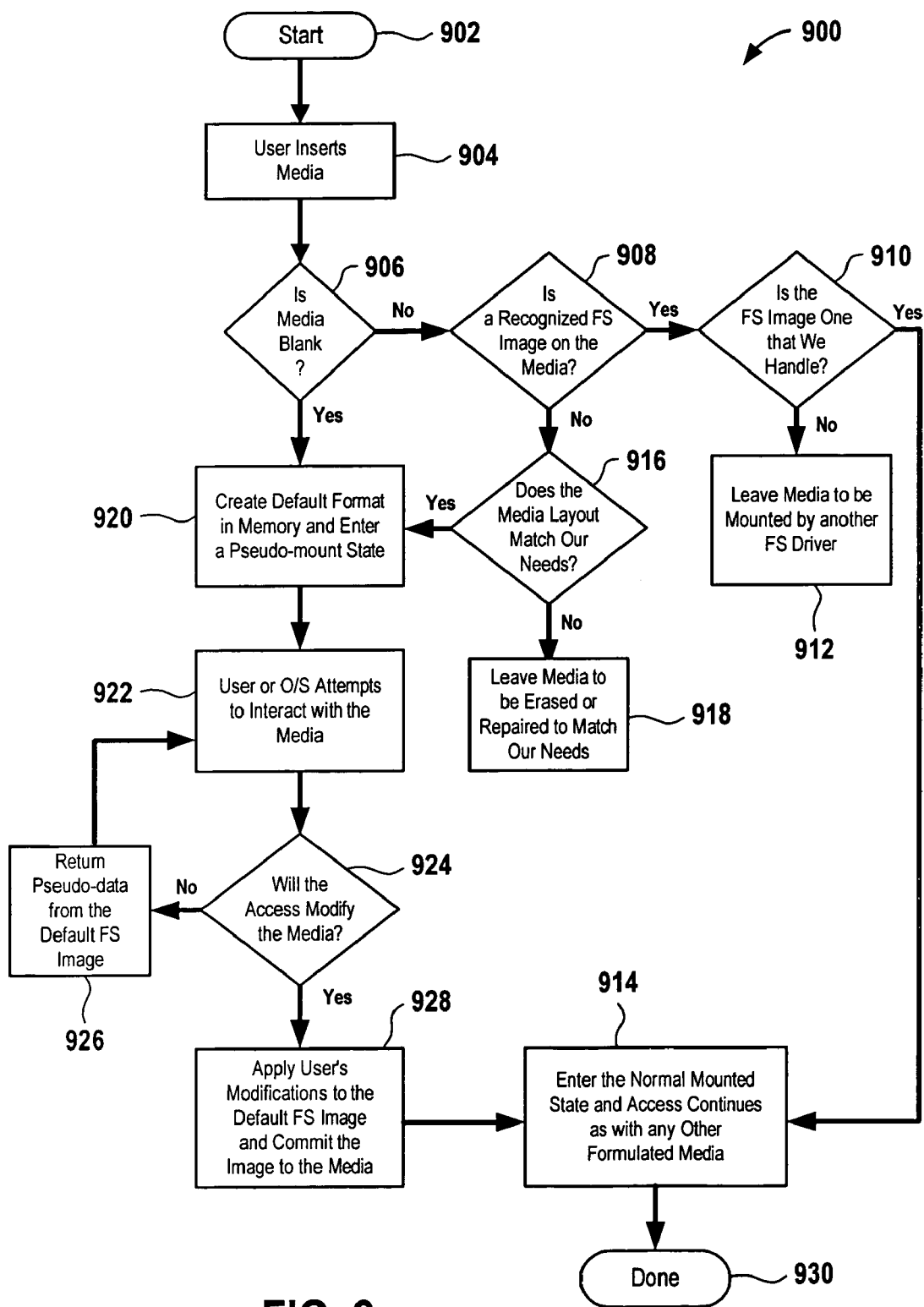
FIG. 9 is a flowchart showing a method for automatically formatting removable media, in accordance with an embodiment of the present invention.

FIG. 9 is a flowchart showing a method 900 for automatically formatting removable media, in accordance with an embodiment of the present invention. In an initial operation 902, preprocess operations are performed. Preprocess operations can include, for example, determining the number and file system types that will be supported by the autoformat file system driver, detecting the type and capabilities of the available system hardware, and other preprocess operations that will be apparent to those skilled in the art after a careful reading of the present disclosure.

In operation 904, the user inserts the media into the drive. The media can be any removable media, such as a CD, DVD, floppy disk, or CD-R/RW. As mentioned previously, when removable media, such as an optical disc, is inserted into a removable media drive, the operating system is notified that new media is present in the drive. The operating system then typically notifies applications that there is new removable media in a drive. Applications interested in such an event, for example a Windows™ shell application, query the operating system for the details of the new media. In response, the operating system queries the high level drivers for information on the new media.

A decision is made as to whether the media is blank, in operation 906. Blank media refers to media that has not been written to and thus contains no block, track, or session structures. Hence, to determine whether the media is blank, the autoformat file system driver attempts to read the disc information from the disc. For example, the disc information for a blank CD-R/RW will indicate zero tracks and zero sessions. Generally, the "blank" description applies to all new media, except for new DVD-RAM. If the media is blank, the method 900 continues to operation 920. Otherwise, the method 900 branches to operation 908.

A decision is made, in operation 908, as to whether a recognized file system image is on the media. When the media is not blank, some type of data has been written to the media. To determine what, if any, file system is present on the media, the autoformat file system driver examines one or more potential anchor points on the media, as illustrated in FIG. 10.

Figure 10:
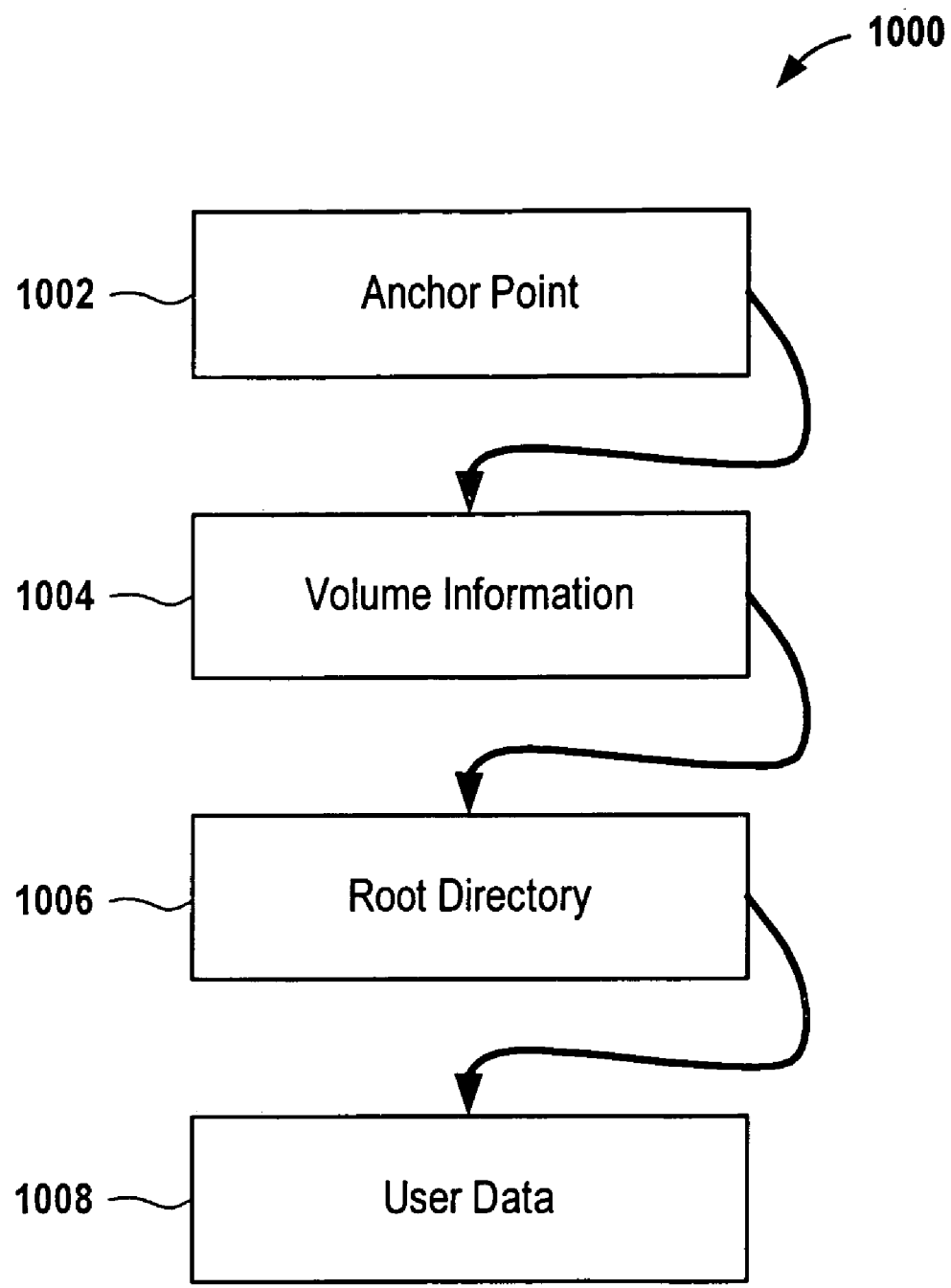
FIG. 10 is a diagram showing a typical data map for an optical disc.

FIG. 10 is a diagram showing a typical data map 1000 for a file system. As shown in the data map 1000, each file system typically includes an anchor point 1002, which indicates the location of the volume information 1004 for the media. The volume information 1004 includes a link to the root directory 1006 for the media, which indicates the location of the user data 1008 on the media.

Each file system, such as UDF or ISO 9660, uses an anchor point 1002 located at a particular block on the media, which indicates the particular file system is present on the media. Each file system defines a particular data structure at its anchor point 1002 to allow file system drivers to recognize the file system. Thus, when a file system driver initially examines a disc, the file system driver examines the block corresponding to the particular file system associated with the driver. The driver then reads the data at the anchor point 1002 location and looks for the particular data structure corresponding the that file system. If the data structure read matches the particular data structure corresponding the file system, the driver will recognize the file system and mount the disc.

Embodiments of the present invention may support more than one file system. Hence, the autoformat file system driver of the embodiments of the present invention examines an anchor point 1002 block on the media for each file system supported by the driver. If a recognizable file system image data structure is discovered at an appropriate anchor point, the autoformat file system driver will recognize the file system on the disc. For example, when the autoformat file system driver supports a UDF file system, the autoformat file system driver will examine block 256 or block 512 and attempt to find the particular data structure that indicates a UDF file system.

Embodiments of the present invention can also be configured to recognize audio discs, which do not include an anchor point based file system. When the autoformat file system driver cannot find a recognizable data structure at the anchor points corresponding to the supported file systems, the driver examines other data blocks on the disc to determine whether data is present. If the autoformat file system driver discovers non-zero data on the disc, and no recognizable data structure has been found, embodiments of the present invention can assume the disc is an audio disc. In this case, the autoformat file system driver can handle the media as though a recognizable file system was found. Thus, referring back to operation 908 of FIG. 9, the media is examined for written data that comprises any of the recognizable file systems (audio, ISO9660, UDF, NTFS, FAT, etc.). If there is recognizable file system data, the method 900 continues with operation 910. Otherwise, the method 900 continues to operation 916.

A determination is made, in operation 910, as to whether the file system image found at the anchor point indicates a file system that the autoformat file system driver can process. The developer of the autoformat file system driver determines which file systems will be supported by the autoformat file system driver. Thus, if the file system image indicates a file system that the current file system driver can process, the method 900 continues to operation 914. Otherwise, the method branches to operation 912, where the media is allowed to be mounted by another file system driver.

In operation 916, the block, track, and session structures on the media are analyzed to determine if the block, track, and session structures are compatible with the autoformat file system driver. In operation 916 the media has been determined not to be blank, however, a recognizable file system has not been discovered nor has the media been determined to be an audio disc. In this case, the media is analyzed to determine whether the autoformat file system driver can still treat the media as though it were blank. For example, in the case of CD-R, a desired format occurs when the disk contains an empty reserved track that is small enough so that block 512 is available for writing in the second track. In this case, the autoformat file system driver can still format the disc to a UDF file system. In another example, CD-RW media that has been completely filled with 0's in fixed packets of 32 blocks per packet can be in a desired format. These examples are representative of the set of possible media states that comprise media with compatible block, track, and session structures, and as such, are further processed in operation 920. Media without compatible structures generally are not managed, and are passed off to allow some error correction software to correct the media, in operation 918.

In operation 920, a default media image is created in memory and a pseudo-mount state is entered. In the pseudo-mount state, a set of default file system structures for the media is internally constructed, as illustrated in FIG. 10. As mentioned above, each file system uses an anchor point 1002 located at a particular block on the media to indicate the particular file system is present on the media. Generally, the anchor point 1002 indicates the location of the volume information 1004 for the media. The volume information 1004 can include, for example, the volume label, when the data was recorded, and the partition size. For example, UDF volume information can include the Volume Descriptor Sequences, Volume Integrity Sequences, possibly spare tables, spare locations and a space bitmap, and a File Set Descriptor. In addition, an entry also indicates the location of the root directory 1006. The root directory 1006 is an anchor point for the user's data 1008, which are the user's files and directories.

Thus, referring back to FIG. 9, the autoformat file system driver creates default volume structures and a root directory entry in memory in operation 920. That is, instead of reading the information from the media and creating a copy of it in memory, embodiments of the present invention generate a media image in memory that includes default file system structures for the media. For example, when creating a UDF file system, the file system structures include the volume information, such as descriptor sequences, volume integrity sequences, spare tables, spare locations, a space bitmap, a file set descriptor, and an entry for a root directory. It should be noted that none of this image is committed to the media itself, hence, the image is retained in memory.

In operation 922, the user or operating system attempts to interact with the media. In response, a decision is made as to whether the access will modify the media in operation 924. If the access will modify the media, the method 900 proceeds to operation 928. Otherwise, the method 900 continues to operation 926.

In operation 926, pseudo-data from the default media image is returned. When the access will not modify the media, the access is a request to read information from the media. As this will not modify the media in any way, the default media image created in operation 920 is used to return data to the user. This gives the impression that the media is formatted and mounted so that neither the user nor the operating system will realize that the media is not mounted.

Thus, when the user or operating system requests information from the new unformatted media, the autoformat file system driver provides the requested data from the media image in memory. In this manner, the operating system and user can interact with the unformatted media in a manner similar to formatted media. Thereafter, the system awaits another access from the user or operating system in operation 922.

However, when the operating system attempts to modify the unformatted media, the user's modifications to the default media image are applied and the image is committed to the media, in operation 928. It should be noted that the user's modifications can be applied to the default image either before or after the image is committed to media. Exactly when the modifications take place depends on the nature of the modifications. Once the modifications are committed, the media contains an appropriate format and is mountable through the regular mount process. As such, the normal mounted state is entered in operation 914, and the user is allowed to continue interacting with the media the same as with any other piece of media.

Post process operations are performed in operation 930. Post process operations can include responding to additional new media, further processing of the removable media, and other post process operations that will be apparent to those skilled in the art. Advantageously, embodiments of the present invention allow new unformatted media to be utilized in a manner similar to using preformatted media. That is, formatting is performed automatically, without user intervention, and generally without any indication to the user that the media is being formatted. Further, the embodiments of the present invention advantageously work regardless of the target file system for the media. For example embodiments of the present invention can be utilized when the target file system can be a universal disk format (UDF), an NT file system (NTFS), a file allocation table (FAT) based file system, or any other type of file system. In addition, the embodiments of the present invention can further be used with other background formatting methods, such as Mt. Rainier, DVD+RW, RWNow!, HP Fast Format, and other background formatting methods.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically formatting removable media, comprising the operations of:
   generating a default media image in computer memory and entering a pseudo-mount state in response to detecting unformatted removable media in a computer drive, the default media image including default file system structures for the unformatted removable media;
   returning pseudo-data based on the default file system structures in the default media image in response to receiving a request to read the unformatted removable media to give an impression that the unformatted removable media is formatted and mounted; and
   automatically preparing the unformatted removable media for content in response to receiving a request to write information to the unformatted removable media, wherein the default media image is committed to the unformatted removable media.

2. A method as recited in claim 1, further comprising the operation of writing the information to the removable media after the default media image is committed to the unformatted removable media.

3. A method as recited in claim 1, further comprising the operation of modifying the default media image to include the information requested to be written prior to committing the default media image to the unformatted removable media.

4. A method as recited in claim 1, further comprising the operation of analyzing the removable media to detect a file system present on the removable media.

5. A method as recited in claim 4, further comprising the operation of mounting the removable media when a predefined file system is detected on the removable media.

6. A method as recited in claim 4, further comprising the operation of determining the removable media is audio media when the removable media includes non-zero data and a file system is not detected on the removable media.

7. A method as recited in claim 1, wherein the removable media is a compact disc.

8. A method as recited in claim 1, wherein the removable media is a digital video disc.

9. A method as recited in claim 1, wherein the removable media is a floppy disk.

10. A file system driver recorded on a computer readable medium for use in conjunction with an operating system, the file system driver comprising:
    a code segment that, when executed by a computer, detects an unformatted removable media in a computer drive and in response to the detecting, generates a default media image in computer memory and enters the unformatted removable media into a pseudo-mount state, the default media image including default file system structures for the unformatted removable media;
    a code segment that, when executed by a computer, returns pseudo-data based on the default file system structures in response to receiving a request to read the media to give an impression that the unformatted removable media is formatted and mounted; and
    a code segment that, when executed by a computer, automatically prepares the unformatted removable media for content in response to receiving a request to write information to the unformatted removable media, wherein the media image is committed to the media.

11. A file system driver as recited in claim 10, wherein the information is written to the removable media after the default media image is committed to the unformatted removable media.

12. A file system driver as recited in claim 10, wherein the default media image is modified to include the information prior to committing the default media image to the unformatted removable media.

13. A file system driver as recited in claim 10, further comprising a code segment that analyzes the removable media to detect a file system present on the removable media.

14. A file system driver as recited in claim 13, wherein the file system driver mounts the removable media when a predefined file system is detected on the removable media.

15. A file system driver as recited in claim 13, wherein the file system driver determines the removable media is audio media when the media includes non-zero data and a file system is not detected on the removable media.

16. A file system driver recorded on a computer readable medium for automatically formatting removable media, comprising:

- a code segment that, when executed by a computer, analyzes media to detect a file system present on the media in response to detecting removable media in a computer drive;
- a code segment that, when executed by a computer, mounts the removable media when the file system detected on the removable media is a predefined file system;
- a code segment that, when executed by a computer, detects an unformatted removable media in a computer drive and in response to the detecting, generates a default media image in computer memory and enters the unformatted removable media into a pseudo-mount state, the default media image including default file system structures for the unformatted removable media;
- a code segment that, when executed by a computer, returns pseudo-data based on the default file system structures in response to receiving a request to read the unformatted removable media to give an impression that the unformatted removable media is formatted and mounted; and
- a code segment that, when executed by a computer, automatically prepares the unformatted removable media for content in response to receiving a request to write information to the unformatted removable media, wherein the default media image is committed to the media.

17. A file system driver as recited in claim 16, wherein the information is written to the removable media after the default media image is committed to the unformatted removable media.

18. A file system driver as recited in claim 16, wherein the default media image is modified to include the information prior to committing the default media image to the unformatted removable media.

19. A file system driver as recited in claim 16, wherein the removable media is a compact disc.

20. A file system driver as recited in claim 16, wherein the removable media is a digital video disc.

21. A file system driver as recited in claim 16, wherein the removable media is a floppy disk.

* * * * *